United States Patent [19]

Wohlgemuth et al.

[11] 4,427,511

[45] Jan. 24, 1984

[54] PHOTO-INDUCED ELECTRON TRANSFER METHOD

[76] Inventors: Roland Wohlgemuth, 2823 Hillegass Ave., Berkeley, Calif. 94705; Melvin Calvin, 2683 Buena Vista Way, Berkeley, Calif. 94708

[21] Appl. No.: 407,494

[22] Filed: Aug. 12, 1982

[51] Int. Cl.$^3$ .............................................. B01J 19/12
[52] U.S. Cl. ......................... 204/157.1 R; 204/158 R; 252/501.1
[58] Field of Search ................... 204/157.1 W, 158 R, 204/157.1 R; 252/501.1

[56] References Cited

U.S. PATENT DOCUMENTS

| | | | |
|---|---|---|---|
| 4,032,977 | 6/1977 | Grätzel | 204/158 R |
| 4,045,315 | 8/1977 | Fletcher . | |
| 4,069,120 | 1/1978 | Meyerand, Jr. et al. | 204/157.1 R |
| 4,094,751 | 6/1978 | Nozik . | |
| 4,105,517 | 8/1978 | Frosch . | |
| 4,166,026 | 11/1979 | Harriman et al. . | |
| 4,169,030 | 9/1979 | Gray et al. . | |
| 4,211,621 | 7/1980 | Porter . | |

FOREIGN PATENT DOCUMENTS

| | | | |
|---|---|---|---|
| 628979 | 10/1961 | Canada | 204/158 R |
| 2815785 | 10/1978 | Fed. Rep. of Germany | 204/158 R |

OTHER PUBLICATIONS

M. Calvin–"Synthetic Chloroplasts", Energy Research, 3, 73–87, (1979).
Moradpour–"Hydrogen Production by Visible Light of Aqueous Solutions of Ru (BiPy)$_3{}^{2+}$, Nouveau Journal de Chimie, vol. 2, No. 6, pp. 547–549.
Sprintschnik et al., "Photochemical Cleavage of Water, A System for Solar Energy Conversion Using Monolayer–Bound Transition Metal Complexes", J.A.S.C. 98, 2338-8 (1976).
Article in Chem. & Eng. News, Aug. 1, 1977, pp. 15-1-6—"Rhodium Complex Splits Water Using Sunlight".

*Primary Examiner*—Howard S. Williams
*Assistant Examiner*—Terryence Chapman
*Attorney, Agent, or Firm*—Phillips, Moore, Lempio & Finley

[57] ABSTRACT

The efficiency of photo-induced electron transfer reactions is increased and the back transfer of electrons in such reactions is greatly reduced when a photo-sensitizer zinc porphyrin-surfactant and an electron donor manganese porphyrin-surfactant are admixed into phospho-lipid membranes. The phospholipids comprising said membranes are selected from phospholipids whose head portions are negatively charged. Said membranes are contacted with an aqueous medium in which an essentially neutral viologen electron acceptor is admixed. Catalysts capable of transfering electrons from reduced viologen electron acceptor to hydrogen to produce elemental hydrogen are also included in the aqueous medium. An oxidizable olefin is also admixed in the phospholipid for the purpose of combining with oxygen that coordinates with oxidized electron donor manganese porphyrin-surfactant.

17 Claims, No Drawings

PHOTO-INDUCED ELECTRON TRANSFER METHOD

The Government has rights in this invention pursuant to Contract No. W-7405-ENG-48 awarded by the U.S. Department of Energy.

BACKGROUND OF THE INVENTION

This invention relates to electron transfer systems; and, more particularly, to electron transfer systems that are driven by photo-energy.

Photo-energy driven systems for electron transfer from one chemical species to another chemical species is of great academic interest, but in recent years has evoked even more interest because of the fossil fuel energy crisis and the obvious non-renewable depletion of fossil fuels. Such depletion has sparked research in the utilization of non-depleting sources, e.g., sunlight, as the driving force for chemical reactions. It is anticipated that such reactions can produce useful products such as high energy molecules, e.g., hydrogen, oxygen, which may, themselves, be used as fuel sources. Such photo-induced reactions also hold potential for the direct production of useful chemical products.

One area that has been rather extensively investigated is the utilization of metal complexes as electron-transfer agents and catalysts to accomplish the photo-dissociation of water into its respective elements, hydrogen and oxygen. Complexes such as the ruthenium porphyrins, ruthenium diiso-cyano compounds, europium complexes, rhodium complexes, and manganese organo-complexes have all been discussed. Such patents as U.S. Pat. Nos. 4,045,315; 4,069,120; 4,094,751; 4,105,517; 4,169,030; 4,176,026; and 4,211,621, all deal with various techniques and methods of utilizing photo-energy in the conversion of water into useful forms of its elements, $H_2$ and $O_2$.

The principal problems encountered by investigators fall into two main areas. First, the relatively low efficiency of the chemical complexes in capturing photons and thereby having their electron's energy levels raised to a sufficient level to be available for interaction with other chemical species, i.e., electron acceptors. Second, the extremely high rate of "back-reaction" whereby any electrons which may be transferred from the photo-activated complexes to electron acceptor species, are immediately transferred back to the electron donor. Such back-reactions thereby effectively negate the useful reaction and impede the further desired dissociation of the water substrate.

Despite reports of progress in overcoming the above-noted problems as set forth in the above-noted patents, the problems of increasing the activation efficiency of the electron donor complexes and reducing the "back reaction" of electron transfer from the electron acceptor back to the electron donor, have not been satisfactorily solved.

The present invention presents an improved photo-induced electron transfer system that deals with the above-noted problems.

BRIEF DESCRIPTION OF THE INVENTION

This invention relates to photo-induced electron transfer systems. But, more particularly, to systems wherein light furnishes the energy to effect electron transfer from light sensitized chemical species to an electron acceptor chemical species. The acceptor is then utilized to reduce the hydrogen component of water to the gaseous element, and the electron depleted, or oxidized sensitizer species then accepts electrons from an electron donor chemical species. The oxidized electron donor is then utilized to coordinate with oxygen from an aqueous substrate. The active coordinated oxygen is, in turn, used to directly produce oxygenated organic products.

In the present invention, the photo conversion process is improved over previously known systems by providing a more efficient method for capturing the photo-energy and thereafter utilizing the energy as a driving force for the conversion reactions.

Unlike previous photo-conversion processes for water, wherein a single chemical species, e.g., a metal complex such as manganese porphyrin, or rhodium "bridge" complex, functions in a dual role as the photo-energy capturing entity (sensitizer) and the electron donor, the present process utilizes two complementary metal complexes to more efficiently utilize the photo-energy. Specifically, a zinc complex, i.e., (5-[1'-hexadecylpyridinium-4'-yl]10,15,20-tris[4'-pyridyl]-21H,23H-porphine-zinc perchlorate (hereinafter abbreviated ZnTPyP-$C_{16}$) is utilized as an efficient photon-capturing entity or photo-sensitizer; and a manganese complex, e.g., bromo-aquo-(5-[1'-hexadecylpyridinium-4'-yl]10,15,20-tris[4'-pyridyl]-21H,23H porphine-manganese perchlorate (hereinafter abbreviated Mn-TPyP-$C_{16}$), is utilized as the electron donor to donate electrons to the electron depleted Zn-TPyP-$C_{16}$ complex.

Both metal complexes, i.e., Zn-TPyP-$C_{16}$ and Mn-TPyP-$C_{16}$ are bound into a negatively-charged membrane derived from lipids, such as phosphatidylglycerol or phosphatidic acid, in order to facilitate electron transfer from the donor Mn-TPyP-$C_{16}$ to the neighboring oxidized Zn-TPyP-$C_{16}$ molecules.

The lipid membrane in the form of small vesicles is, in turn, dispersed within an aqueous solution in which the electron acceptor is dissolved. This arrangement is very important for increasing the efficiency of the system and for reducing back reaction between the oxidized photo-sensitizer and the reduced electron acceptor.

More specifically, photo-conversion systems are plagued by the back transfer of electrons from the reduced electron acceptor to the oxidized metal complexes. This reaction competes with the intended further conversion, i.e., dissociation steps and effectively quenches the conversion process.

In the present system, however, the lipid membrane surface continually carries a net negative surface charge thereon. The electron acceptor, for instance, propyl viologen sulfonate, is neutral in the normal state. Therefore, it can freely approach the lipid membrane surface where it accepts electrons from the photo-activated ZnTPyP-$C_{16}$ molecules, whose hydrophilic head portions lie at the membrane surface.

Once an electron is accepted, however, the now negatively-charged acceptor is immediately repelled away from the membrane surface and through the aqueous medium. Back transfer of electrons from the acceptor to the donor thus takes place with difficulty, and this undesired back reaction is effectively reduced. The repelled electron-rich acceptor is then available for use in mediating further electron transfers; specifically for the catalytic reduction of $H^+$ in water to elemental gaseous $H_2°$.

The sensitizer, ZnTPyP-$C_{16}$, having transferred electrons to the acceptor in the aqueous medium and having the rate of electron back-reaction greatly reduced, is thereby freed to react with nearby $Mn-TPyP-C_{16}$ complexes to accept electrons and thereby oxidize the Mn complex.

The oxidized Mn complex is then available to further coordinate with oxygen from the surrounding water medium. The oxygen-Mn coordination complex may then further enter into reactions with a suitable organic substrate, i.e., an oxidizable organic molecule, such as an olefin, or the like, to capture the oxygen from the coordination complex and produce a useful oxygenated organic product.

It is therefore an object of the invention to increase the efficiency of photo-induced electron transfer processes.

It is another object of the invention to provide a photo-driven process for the production of elemental hydrogen and oxygenated organic compounds from water and oxidizable organic compounds.

It is still another object to provide a process for achieving the photo-induced transfer of electrons from metal complexes mixed into a hydrophobic medium to electron acceptor species dissolved in a surrounding aqueous medium.

It is still another object of the invention to produce oxygenated organic compounds by the photo-induced dissociation of water.

It is still another object of the invention to increase the capture efficiency of photon-energy and utilization of the photon capture energy to drive electron transfer reactions between metal complex electron donors and acceptors; and between organic electron acceptors and metal complex electron donors.

It is yet another object of the invention to reduce the rate of "back-reaction" between an electron donor species and an electron acceptor species.

Other objects and advantages of the invention will be apparent from a review of the following specifications and the claims appended hereto.

DETAILED DESCRIPTION OF THE INVENTION

In its broadest aspect, the photo-driven electron transfer system of the invention may be schematically depicted as:

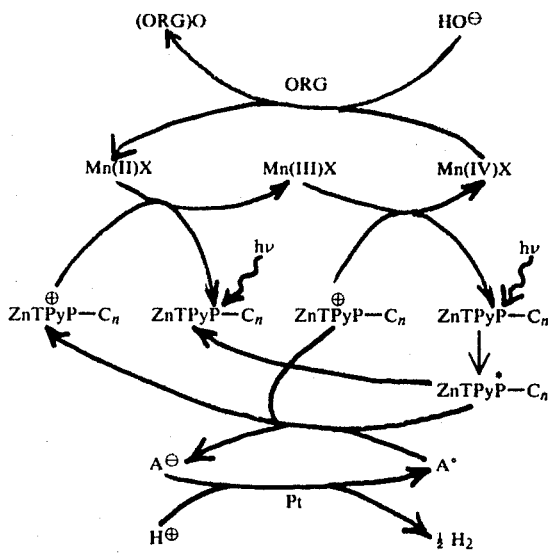

where:
ORG = olefinic hydrocarbon
(ORG)O = oxygenated hydrocarbon
MnX = manganese complex electron donor
III or IV = oxidation states of the manganese-complex electron donor
$ZnTPyP-C_n$ = zinc tetrapyridyl porphyrin-surfactant, photo-sensitizer
$ZnTPyP^*-C_n$ = photo activated sensitizer
$ZnTP^+yP-C_n$ = oxidized zinc tetrapyridyl porphyrin-surfactant
A = electron acceptor
Pt = platinum catalyst
O = oxygen
H = hydrogen According to the above scheme, light energy, $h\nu$, is impinged upon a photo sensitizer, specifically, a zinc tetrapyridyl porphyrin-surfactant ($ZnTPyP-C_n$) complex. Upon absorption of the light energy, the $ZnTPyP-C_n$ complex becomes activated, and upon contact with a suitable electron acceptor, $A^o$, transfers an electron thereto. The sensitizer is thereby oxidized to $ZnTP+yP-C_n$. Simultaneously, by the electron transfer, the acceptor is reduced to $A^-$. The reduced acceptor, $A^-$, is then available for the transfer of an electron to hydrogen ion, $H^+$, (from the surrounding aqueous medium, and with the aid of a catalyst) and to thereby produce elemental hydrogen as a product. On giving up electrons to the hydrogen, the acceptor is recycled to the neutral state, whereby it is once again available to accept electrons from the photo-activated zinc complex.

When the zinc complex is oxidized upon transferring an electron to the acceptor, $A^o$, it is available to accept an electron from the donor manganese complex, MnX. The zinc complex is thereby reduced back to its ground state, $ZnTPyP-C_n$, and is once again available to be activated by the impinging photo energy, $h\nu$. At the same time, the donor manganese complex, Mnx, is oxidized to a higher valance state, e.g., from Mn(III) to Mn(IV). The oxidized Mn complex is thereupon available to coordinate with oxygen from the aqueous medium. In the presence of a suitable olefinic hydrocarbon, the coordinated oxygen transfers and produces oxygenated hydrocarbon, while the manganese complex is reduced back to its lower oxidation state, where it is once again available to donate electrons to the oxidized Zn complex.

In the scheme as discussed, it will be noted that the zinc complex, manganese complex, and electron acceptor are continuously recycled, and are not lost to the reaction system. The products from the system are elemental (gaseous) hydrogen, and an oxygenated hydrocarbon. Photo-energy and water, as well as the olefinic hydrocarbon, are used up. Thus, water and an olefin are used to produce useful products.

It is noted that the above scheme relies upon a series of simultaneous and competing electron transfer processes. In addition, it may be appreciated that a number of the reactions, e.g., electron transfer from the zinc complex sensitizer to the acceptor, are quite reversible. Thus, while the scheme is theoretically of interest, from a practical standpoint, the "back-reactions" would ordinarily prevent any effective use of the reaction schemes. Thus, they must somehow be prevented, or greatly reduced.

In the present invention, these competing back-reactions are greatly reduced by "isolating" the various reactions. More specifically, the sensitizer and donor complexes are retained within a hydrophobic medium, while the electron acceptor is dissolved in a surrounding aqueous medium. This separation, along with electrical charge mechanisms, as will be explained hereinafter, effectively isolate the competing reactions to greatly reduce the "back-reaction" rates, and permit the reaction processes to take place in the most advantageous directions.

More specifically, the zinc sensitizer complex is synthesized with a suitable hydrophobic "tail". The zinc porphyrin "head" of the complex molecule is, however, hydrophilic. Similarly, the manganese complex electron donor is also synthesized with a hydrophobic "tail", while its manganese porphyrin "head" is hydrophilic. Both zinc and manganese complexes are, therefore, soluble in lipids. The lipids, in turn, form water-insoluble membranes in an aqueous medium by well-known techniques. Thus, the zinc and manganese complexes are, in effect, surfactants; that is, they dissolve into the lipid membranes with their hydrophobic tail portions buried within the lipid structures, while their hydrophilic head portions lie at the lipid-water interface.

The lipid structures are most suitably formed from phosphatidyl glycerols, or phosphatidic acid, although many membrane forming phospho-lipids will serve this purpose. Such lipids as 1,2-dimyristoyl-glycero-3-phospho-D,L,-glycerol,sodium salt (DMPG); egg-phosphatidyl-D,L,-glycerol (EggPG); and 1,2,-dimyristoyl-sn-glycero-3-phosphate (DMPA) are especially useful.

These lipid materials form membrane surfaces that are negatively charged at the lipid-aqueous interface. The negatively-charged lipid surface is indispensible in the "isolation" of these various competing electron interchanges that can take place in the photo-induced reactions. The noted phosphatidyl glycerols form such negatively-charged membranes.

Thus, the neutral, $PVS°$ can freely approach the negatively-charged membrane surface and is, therefore, available to accept an electron from the photo-sensitized $ZnTPyP-C_{16}$ molecules that are arranged in the lipid layers. However, once an electron is accepted, the now negatively-charged $PVS^-$, is repelled from the lipid surface. It is only with difficulty that the reduced $PVS^-$ can approach the negatively-charged lipid surface and enter into back-electron transfer with the photo-sensitizer or oxidized electron donor $Mn(IV)$-$TPyP-C_{16}$. Therefore, the normally "quenching" back-reaction is greatly diminished and the various electron transfer reactions are "compartmentalized" in the desired directions.

The zinc tetrapyridyl porphyrin is synthesized with a hydrocarbon tail, e.g., hexadecyl, in order to impart the desired surfactant properties thereto. That is, the tetrapyridyl porphyrin head portion of the molecule is hydrophilic, while the hydrocarbon tail is hydrophobic. The zinc tetrapyridyl porphyrin - $C_{16}$ hydrocarbon exhibits surfactant properties, i.e., it dissolves in the phospholipid material with its hydrocarbon tail buried in the membrane while its hydrophilic head portion with the zinc porphyrin at, or in, the membrane surface.

It will be apparent that the $ZnTPyP-C_{16}$ molecules may have other lengths of hydrocarbon moieties replace the $C_{16}$ hydrocarbon. It is only important that the tail portion renders the zinc complex soluble in the phospho-lipid layers.

Similarly, the manganese electron donor porphyrin complex is synthesized with a hydrocarbon tail, e.g., hexadecyl—in order that it too will act as a surfactant and dissolve in the phospholipids. It, too, may have other hydrocarbons as the tail portion thereof, so that it acts in the same manner as the zinc complex.

The propyl viologen sulfonate, PVS, which chemically is N,N'-bis (sulfonato-n-propyl)-4,4'-bipyridyl is an essentially neutral electron acceptor that is soluble in water. It is prepared by reacting a bipyridine dihydrate with a propane-sultone, as will be more fully described hereinafter. PVS readily accepts electrons to form the reduced viologen compound, $PVS^-$. In the presence of a suitable catalyst, e.g., finely divided platinum, and in aqueous medium at $\leq pH\ 7$, the reduced viologen compound will react with aqueous hydrogen ion to yield elemental hydrogen.

The following example will present further details of the preparation of the reactants and the operation of the invention process.

Preparation of the photosensitizer and electron donor

The Zn-photosensitizer, 5-(1'-hexadecylpyridinium-4'-yl)-10,15,20-tris-[4'-pyridyl]-21H,23H-porphine-zinc perchlorate as well as the electron donor, bromo-aquo-(5-[1'-hexadecylpyridinium-4'-yl]-10,15-20-tris[4'-pyridy]-21H,23H-porphine)-manganese perchlorate, were prepared according to the method of Okuno et al., disclosed in Synthesis, 7,537–539 (1980), which disclosure is incorporated herein by reference. The purity was checked by HPLC on a Rheodyne $NH_2$ column in $CHCl_3/MeOH$ at 95:5.

Preparation of the electron acceptor

Propyl viologen sulfonate, PVS, was prepared in the following way: A mixture of 4,4'-bipyridine dihydrate (7 mmol, from ALDRICH Chemical) and 1,3-propane-sultone (70 mmol, ALDRICH, 97%) was heated for 10 minutes to 100° C., then cooled and mixed with 15 ml MeOH (from MALLINCKRODT Chemicals, AR). The resulting suspension was stirred for 24 hours at room temperature, then filtered and washed three times with a total of 20 ml MeOH. Elemental analysis: Calc. (for $C_{16}H_{20}N_2S_2O_6 \cdot H_2O$): C, 45.93, H, 5.26, N, 6.70, S, 15.31. Found: C, 45.99, H, 5.04, N, 6.42, S, 15.32. The $^1H$-NMR spectrum in $D_2O$ was as expected.

The lipids sn phosphatidyl-DL-glycerol sodium salt, both dimyristoyl- and egg derivatives, were purchased from CALBIOCHEM, while 1,2-dimyristoyl-sn-glycero-3-phosphate disodium salt was purchased from R. Berchtold, Biochemical Laboratory (Mattenhofstr.34, 3007, Berne, Switzerland).

Preparation of the lipid membranes and the aqueous medium

Three $\mu$mol of phospholipid were mixed with the long chain Zn-sensitizer, ZnTPyP-$C_{16}$, and the donor MnTPyP-$C_{16}$ in MeOH/CHCl$_3$ at 1:1. The solution provided adequate mixing of the components. The solvent was then removed, first with a stream of $N_2$, then with high vacuum drawn for several hours. A reference sample which did not contain the electron donor, MnTPyP-$C_{16}$, was prepared in exactly the same manner. After drying, 3 ml of ion exchanged and twice distilled water was added, the suspension was sonicated for about 10 minutes at a temperature above phase transition, and finally 0.5 ml of $10^{-2}$M electron acceptor, PVS, solution was added. The aqueous phase was at a pH of 7. This produced a suspension of lipid vesicles that incorporated the ZnTPyP-$C_{16}$, photosensitizer, and electron donor, Mn-TPyP-$C_{16}$ therein. The vesicles were suspended in the aqueous medium having the electron acceptor, PVS°, dissolved therein.

Apparatus

The illumination was performed after the vesicle suspension was transferred to an oxygen-tight cuvette equipped with glass stopcocks, a teflon stirring bar and a septum. The suspension was deaerated by repeated evacuation and flushing with argon. A collimated beam of a 1000 W xenon lamp (operating at 25 V, 40 A) passed through 10 cm water. An interference filter with a transmission maximum at 430 nm and 10 nm full width at half-maximum selected the photons. The cuvette was in a water bath at room temperature and had a magnetic stirring bar. The incident photon flux, as checked with Reinecke salt actinometry and by direct measurement with an EG&G photometer in conjunction with a B1669 flat filter and an OD-4 neutral density filter was $3.1 \times 10^{-6}$ (E/min-cm$^2$). Absorbance spectra were measured on an HP-8450 spectrophotometer.

In the described system, the electron donor, MnTPyP-$C_{16}$, and photosensitizer, ZnTPyP-$C_{16}$, were distributed in both layers of the membrane and the electron acceptor, PVS, which was added after the vesicles had been formed, was on the outside of the vesicle.

Illumination of this system at 430 nm (Soret band of the ZnTyP-$C_{16}$) resulted in the disappearance of Mn$^{III}$TPyP-$C_{16}$ and the formation of a new peak at $\lambda = 424$ nm, characteristic for Mn$^{IV}$TPyP-$C_{16}$. The presence of isosbestic points shows that Mn$^{III}$ was converted quantitatively to Mn$^{IV}$. In about 30 minutes, Mn$^{III}$TPyP-$C_{16}$ was completely oxidized to the Mn$^{IV}$ compound. By increasing the donor concentration, PVS$^-$ could be observed and the ratio between the decrease in Mn$^{III}$ concentration and the increase in PVS$^-$ was approximately 1:1.

Elimination of the PVS° from the system resulted in no change in the absorption spectrum of the donor when the system was illuminated in the manner described above. If the membrane was constituted of DMPG or DMPA instead of egg-PG, but otherwise the same conditions used, the system responded in the same way as before, giving the Mn$^{IV}$TPyP-$C_{16}$. The experiments indicate that the back-reaction between the oxidized Zn-sensitizer and the reduced PVS is dramatically retarded in the case of a negatively-charged membrane.

In another experiment, prepared and carried out as described above, several different olefins were dissolved in the vesicle membranes in which the photosensitizer, ZnTPyP-$C_{16}$, and electron donor, MnTPyP-$C_{16}$, were also organized. The electron acceptor, PVS°, was dissolved in the surrounding aqueous medium (pH 7). Some of the olefins tested were 5-hexenoic acid, cyclohexene, and norbornene.

In each case, oxidized olefin was produced as evidenced by the quantum yield of reduced PVS. In the case of 5-hexenoic acid, the PVS$^-$ quantum yield increased by a factor of about 50 as compared with the identical experiment conducted without the presence of the olefin, where the olefin was incorporated in micelle membranes. In the case of cyclohexene and norbornene, the yield of reduced PVS$^-$, increased by a factor of from 5 to 10 times over the reference experiment conducted without the olefin.

When finely divided platinum was added to the aqueous phase, the reduced PVS$^-$, was quickly converted to the neutral compound, PVS°. This oxidation catalysis of the PVS was accompanied by the release of elemental $H_2$ within the aqueous phase.

The net result of the oxygenation of the olefin and catalytic oxidation of the reduced, propyl viologen sulfonate is the photo-induced dissociation of water. The electron donor, MnTPyP-$C_{16}$, the photo-sensitizer, ZnTPyP-$C_{16}$, and the electron acceptor, PVS, are all recycled in the photo process, and they may be continually reused in the production of elemental $H_2$ and oxygenated olefin.

We claim:

1. An improved photo-energy induced electron transfer method wherein an aqueous medium is dissociated comprising mixing a photo-sensitizer zinc porphyrin-surfactant, an electron donor metal complex-surfactant, and an oxidizable organic reactant with a phospholipid having a negatively-charged hydrophilic head portion, forming said phospholipid and admixed photo-sensitizer zinc-porphyrin-surfactant, electron donor metal complex-surfactant, and oxidizable organic reactant into a negatively surface charged membrane, contacting said membrane and admixed components with an aqueous medium in which an essentially uncharged electron acceptor is dissolved, and also in which a catalyst is admixed, contacting the photo sensitizer with photo-energy to thereby activate said photo-sensitizer, thereupon transfering an electron from the activated photo-sensitizer to the electron acceptor to thereby negatively charge said electron acceptor and repel the charged electron acceptor from the negatively surface charged membrane, catalysing a reaction between the negatively-charged electron acceptor and the aqueous medium to release elemental hydrogen therefrom, transfering electrons from the electron donor metal complex-surfactant to the electron deficient photo-sensitizer to oxidize the electron donor and reduce the photo-sensitizer back to its original state, contacting the oxidized electron donor with the aqueous medium to thereby form an oxygen coordinated-electron donor complex, contacting the oxygen coordinated-electron donor complex with the oxidizable organic reactant to oxygenate said organic reactant and reduce said electron donor.

2. The method of claim 1 wherein the electron donor is a manganese porphyrin-surfactant 3. The method of claim 2 wherein the manganese porphyrin-surfactant is bromo-aquo-(5-[1'-hexadecylpyridinium-4'-yl]10,15,20-tris[4'-pyridyl]-21H,23H-porphine-manganese perchlorate.

4. The method of claim 1 wherein the photo-sensitizer is 5-[1'-hexadecylpyridinium-4'-yl]10,15,20-tris[4'-pyridyl]21H,23H,-porphine-zinc perchlorate.

5. The method of claim 1 wherein the oxidizable organic reactant is an olefin.

6. The method of claim 1 wherein the negatively-charged phospholipid is a phosphatidyl glycerol.

7. The method of claim 6 wherein the phospholipid is egg-phosphatidyl-D,L,-glycerol.

8. The method of claim 6 wherein the phospholipid is 1,2,-dimyristoyl-glycero-3-phospho-D,L,-glycerol.

9. The method of claim 6 wherein the phospholipid is 1,2,-dimyristoyl-sn-glycero-3-phosphate.

10. The method of claim 1 wherein the electron acceptor is a viologen compound.

11. The method of claim 10 wherein the viologen compound is propyl viologen sulfonate.

12. The method of claim 1 wherein the catalyst is finely divided platinum.

13. The method of claim 1 wherein said membrane is organized into a vesicle.

14. A method for improving photo-energy induced electron transfer comprising associating a photosensitizer metal complex-surfactant and an electron donor metal complex-surfactant with an hydrophobic medium, said hydrophobic medium having an oxidizable organic reactant also associated therewith, contacting the hydrophobic medium with an aqueous medium having an electron acceptor dissolved therein, said hydrophobic medium forming a phase boundary at the aqueous medium interface and wherein the photosensitizer metal complex portion of the photosensitizer metal complex-surfactant and the electron donor metal complex portion of the electron donor metal complex-surfactant lie within the phase boundary and further wherein the hydrophobic medium produces a negatively charged phase boundary, contacting the photosensitizer with photo-energy to thereby activate said photosensitizer, transfering an electron from the activated photosensitizer to the electron acceptor to thereby negatively charge said electron acceptor and repel the charged electron acceptor from the negatively surface charged phase boundary, catalyzing a reaction between the negatively-charged electron acceptor and the aqueous medium to release elemental hydrogen therefrom, transfering electrons from the electron donor metal complex-surfactant to the electron deficient photosensitizer to oxidize the electron donor and reduce the photosensitizer back to its original state, contacting the oxidized electron donor with the aqueous medium to thereby form an oxygen coordinated-electron donor complex, contacting the oxygen coordinated-electron donor complex with the oxidizable organic reactant to oxygenate said organic reactant and reduce said electron donor.

15. The method of claim 14 wherein the photosensitizer metal complex in zinc porphyrin.

16. The method of claim 14 wherein the electron donor metal complex is manganese porphyrin.

17. The method of claim 14 wherein the hydrophobic medium is a lipid.

* * * * *